US012191095B2

(12) United States Patent
Komatsu et al.

(10) Patent No.: US 12,191,095 B2
(45) Date of Patent: Jan. 7, 2025

(54) ELECTROMAGNETIC RELAY DEVICE

(71) Applicants: DENSO CORPORATION, Kariya (JP); DENSO ELECTRONICS CORPORATION, Kariya (JP)

(72) Inventors: Jun Komatsu, Kariya (JP); Hiroshi Nagura, Kariya (JP); Naoki Uejima, Anjo (JP)

(73) Assignees: DENSO CORPORATION, Kariya (JP); DENSO ELECTRONICS CORPORATION, Anjo (JP)

( * ) Notice: Subject to any disclaimer, the term of this patent is extended or adjusted under 35 U.S.C. 154(b) by 113 days.

(21) Appl. No.: 17/940,499

(22) Filed: Sep. 8, 2022

(65) Prior Publication Data

US 2023/0005689 A1 Jan. 5, 2023

Related U.S. Application Data

(63) Continuation of application No. PCT/JP2021/009581, filed on Mar. 10, 2021.

(30) Foreign Application Priority Data

Mar. 11, 2020 (JP) ................................ 2020-042233

(51) Int. Cl.
*H01H 50/18* (2006.01)
*H01H 50/36* (2006.01)

(52) U.S. Cl.
CPC ............ *H01H 50/18* (2013.01); *H01H 50/36* (2013.01)

(58) Field of Classification Search
CPC ........ H01H 50/18; H01H 50/36; H01H 50/64; H01H 50/12
See application file for complete search history.

(56) References Cited

U.S. PATENT DOCUMENTS

| | | | | |
|---|---|---|---|---|
| 8,222,980 B2 * | 7/2012 | Yamagata | H01H 1/66 | 335/133 |
| 2015/0054604 A1 * | 2/2015 | Kubono | H01H 50/20 | 335/177 |
| 2015/0054605 A1 * | 2/2015 | Kubono | H01H 9/443 | 335/177 |
| 2016/0141132 A1 * | 5/2016 | Enomoto | H01H 50/18 | 335/189 |

(Continued)

FOREIGN PATENT DOCUMENTS

| | | |
|---|---|---|
| CN | 105529218 A | 4/2016 |
| CN | 107424871 A | 12/2017 |

(Continued)

*Primary Examiner* — Shawki S Ismail
*Assistant Examiner* — Lisa N Homza
(74) *Attorney, Agent, or Firm* — Oliff PLC

(57) ABSTRACT

An electromagnetic relay device includes a mover, a plunger, and a solenoid unit that causes the plunger to reciprocate. The mover includes a movable contact movable to abut onto or separate from a stationary contact. The plunger causes the mover to reciprocate to accordingly cause the movable contact to abut onto or separate from the stationary contact. A heat-resistant member is interposed between the insulator and the mover. The plunger enables indirect abutment onto the mover through the insulator and the heat-resistant member. A heat-resistant temperature of the heat-resistant member is set to be higher than that of the insulator.

5 Claims, 8 Drawing Sheets

(56) References Cited

U.S. PATENT DOCUMENTS

| | | | | |
|---|---|---|---|---|
| 2020/0273650 | A1 | 8/2020 | Tanaka et al. | |
| 2020/0350134 | A1 | 11/2020 | Ishikawa et al. | |
| 2023/0005692 | A1* | 1/2023 | Tanimoto ............... | H01H 50/36 |

FOREIGN PATENT DOCUMENTS

| | | | |
|---|---|---|---|
| CN | 207264979 | U | 4/2018 |
| JP | 2004127812 | A | 4/2004 |

* cited by examiner

ELECTROMAGNETIC RELAY DEVICE

CROSS-REFERENCE TO RELATED APPLICATION

The present application is a bypass continuation application of a currently pending international application No. PCT/JP2021/9581 filed on Mar. 10, 2021 designating the United States of America, the entire disclosure of which is incorporated herein by reference, the internal application being based on and claiming the benefit of priority of Japanese Patent Application No. 2020-042233 filed on Mar. 11, 2020. The disclosure of the Japanese Patent Application No. 2020-042233 is incorporated in its entirety herein by reference.

TECHNICAL FIELD

The present disclosure relates to electromagnetic relay devices.

BACKGROUND

Typical electromagnetic relay devices, an example of which is disclosed in Japanese Patent Application Publication No. 2019-133843, include a mover, a plunger, and an insulator. The mover includes at least one stationary contact and at least one movable contact that abuts onto or separates from the at least one stationary contact. The plunger moves the mover, and the insulator electrically insulates the mover and the plunger from each other. That is, the insulator prevents a current from flowing toward the plunger.

SUMMARY

An increase in the current flowing through the mover in such an electromagnetic relay device may result in the mover being likely to become higher in temperature due to Joule heat based on the current. A high-temperature mover may cause the insulator abutting onto the high-temperature mover to become higher in temperature. This may cause deformation of the insulator. A deformation of the insulator may cause a detrimental effect on operations of the electromagnetic relay device.

In view of the circumstances set forth above, one aspect of the present disclosure seeks to provide electromagnetic relay devices, each of which is capable of preventing a detrimental effect due to a high-temperature mover on operations of the corresponding one of the electromagnetic relay devices.

A first exemplary measure of the present disclosure is an electromagnetic relay device. The electromagnetic relay device includes a mover including a movable contact movable to abut onto and separate from a stationary contact. The electromagnetic relay device includes a plunger configured to cause the mover to reciprocate to accordingly cause the movable contact to abut onto or separate from the stationary contact. The electromagnetic relay device includes a solenoid unit configured to cause the plunger to reciprocate, and an insulator having a heat-resistant temperature and arranged between the mover and the plunger.

The electromagnetic relay device additionally includes a heat-resistant member having a heat-resistant temperature and interposed between the insulator and the mover. The plunger enables indirect abutment onto the mover through the insulator and the heat-resistant member. The heat-resistant temperature of the heat-resistant member is set to be higher than the heat-resistant temperature of the insulator.

A second exemplary measure of the present disclosure is an electromagnetic relay device. The electromagnetic relay device includes a mover including a movable contact movable to abut onto and separate from a stationary contact. The electromagnetic relay device includes a plunger configured to cause the mover to reciprocate to accordingly cause the movable contact to abut onto or separate from the stationary contact. The electromagnetic relay device includes a solenoid unit configured to cause the plunger to reciprocate.

The electromagnetic relay device includes a heat-resistant insulator interposed between the plunger and the mover. The plunger enables indirect abutment onto the mover through the heat-resistant insulator. The heat-resistant insulator is made of at least one of glass and ceramic.

The heat-resistant member of the electromagnetic relay device according to the first exemplary measure is interposed between the insulator and the mover. This suppresses an increase in the temperature of the insulator even if the temperature of the mover becomes high due to an increase in a current flowing in the electromagnetic relay device. This therefore prevents a detrimental effect due to the high-temperature mover on operations of the electromagnetic relay device.

The heat-resistant insulator of the electromagnetic relay device 1 according to the second exemplary measure is interposed between the plunger and the mover to electrically insulate therebetween. This results in the heat-resistant insulator, which has heat resistance property, being unlikely to deform even if the temperature of the mover becomes high due to an increase in a current flowing in the electromagnetic relay device. This therefore prevents a detrimental effect due to the high-temperature mover on operations of the electromagnetic relay device.

As described above, each of the first and second exemplary measures offers the corresponding electromagnetic relay device, which is capable of preventing a detrimental effect due to a high-temperature mover on operations of the corresponding electromagnetic relay device.

Note that each parenthesized reference character assigned to a corresponding element in claims described later represents a relationship between the corresponding element and a corresponding specific measure described in embodiments described later, and therefore the parenthesized reference characters used in the claims should not be interpreted implying limitation.

BRIEF DESCRIPTION OF THE DRAWINGS

Other aspects of the present disclosure will become apparent from the following description of an embodiment with reference to the accompanying drawings in which.

DETAILED DESCRIPTION OF EMBODIMENTS

First Embodiment

Figure 1:
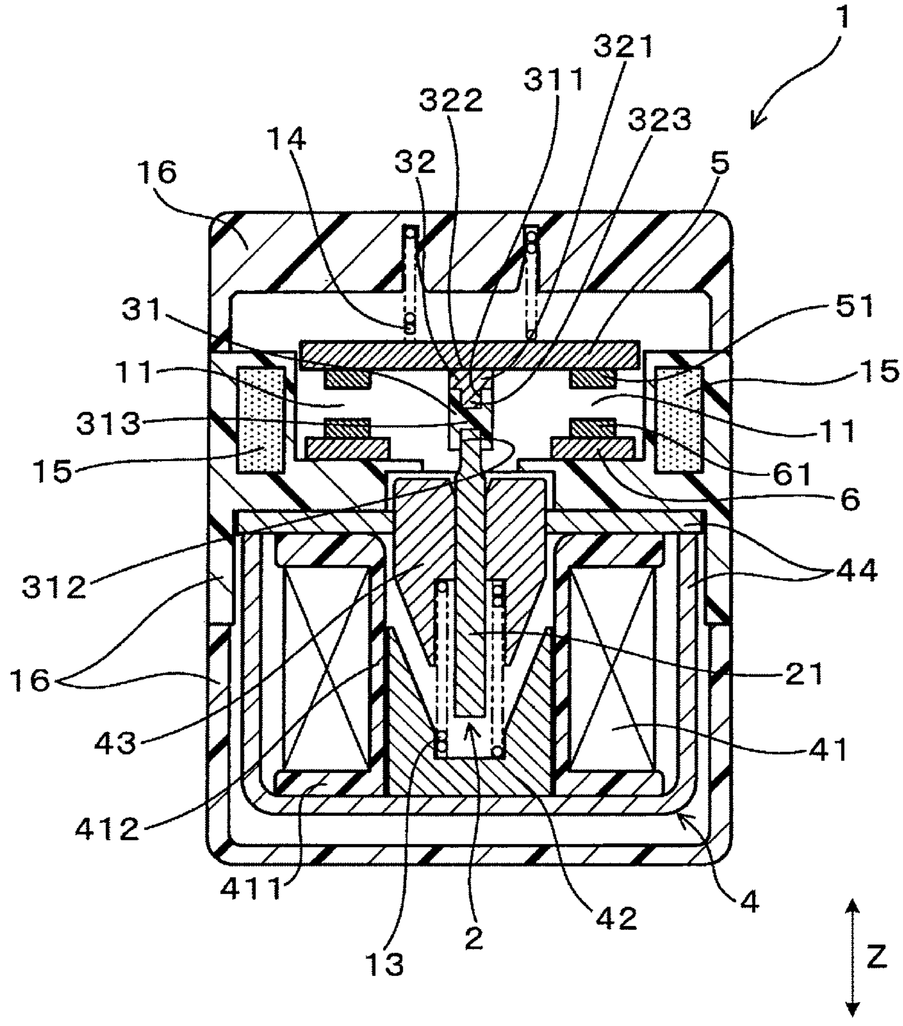
FIG. 1 is an axial cross-sectional view of an electromagnetic relay device according to the first embodiment with a heat-resistant member abutting onto a mover.
Figure 2:
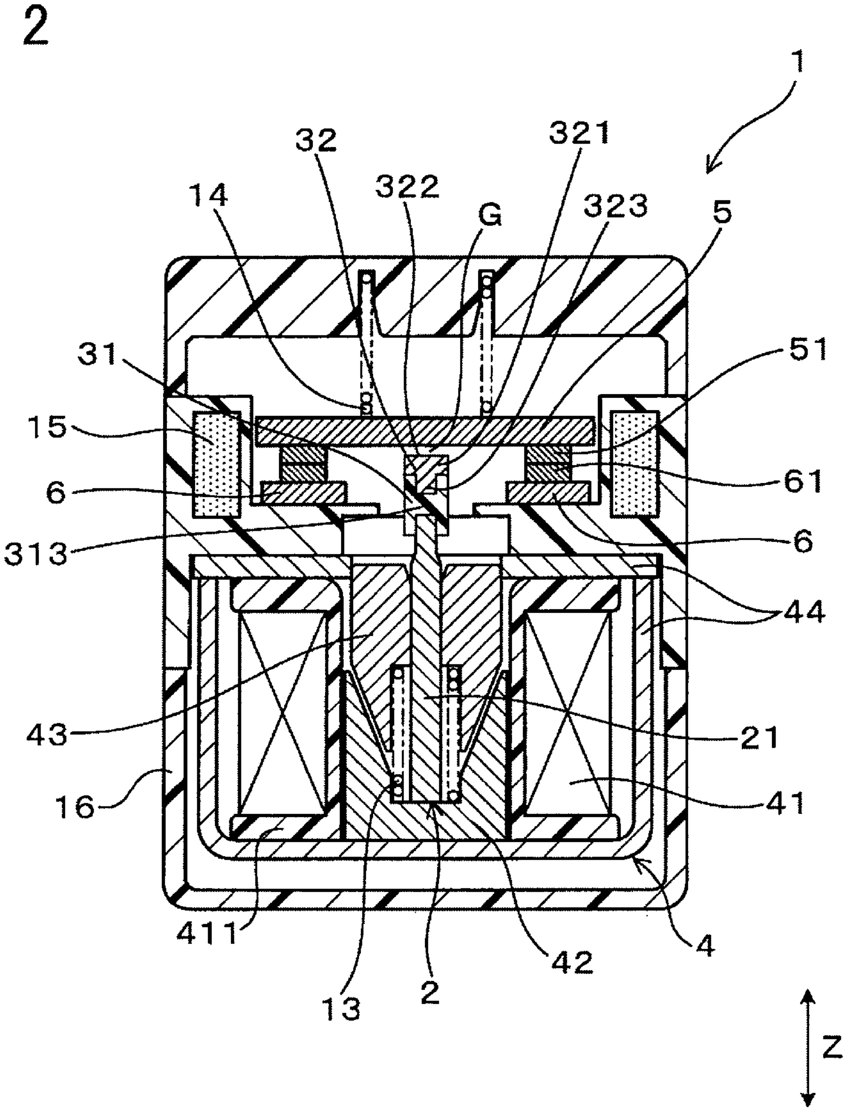
FIG. 2 is an axial cross-sectional view of the electromagnetic relay device according to the first embodiment with the heat-resistant member separated from the mover.

The following describes an electromagnetic relay 1 according to the first embodiment of the present disclosure with reference to FIGS. 1 and 2.

Referring to FIGS. 1 and 2, the electromagnetic relay device 1 includes a mover 5, a plunger 2, a solenoid unit 4 for causing the plunger 2 to reciprocate, and first and second stationary contacts 61. The mover 5 includes first and second movable contacts 51 that are movable to abut onto and separate from the respective first and second stationary contacts 61. That is, reciprocation of the plunger 2 causes the mover 5 to reciprocate to accordingly cause the first and second movable contacts 51 to abut onto or separate from the respective first and second stationary contacts 61.

The electromagnetic relay device 1 also includes an insulator 31 and a heat-resistant member 32, and the plunger 2 is arranged to be in an indirect contact with the mover 5 through the insulator 31 and the heat-resistant member 32. That is, the heat-resistant member 32 is interposed between the insulator 31 and the mover 5. Each of the insulator 31 and the heat-resistant member 32 individually has a heat-resistant temperature, and the heat-resistant temperature of the heat-resistant member 32 is set to be higher than that of the insulator 31.

A reciprocation direction in which the plunger 2 reciprocates may be sometimes referred to simply as a Z direction in the specification. The reciprocation direction Z has opposite first and second sides, the first side of the reciprocation direction Z in which the plunger 2 presses the mover 5 will be referred to as a forward direction, and the second side of the reciprocation direction Z, which is opposite to the first side of the reciprocation direction Z, will be referred to as a rearward direction.

The electromagnetic relay device 1 can be used as, for example, a relay for a power charger or a power converter that is installable in electric vehicles or hybrid vehicles. When the electromagnetic relay device 1 is in an on state, a large amount of current, which is within the range from 100 to 400 amperes (A) inclusive, may flow through the stationary and movable contacts 61 and 51.

The electromagnetic relay device 1 includes a housing 16 that houses the mover 5, plunger 2, and solenoid unit 4. The housing 16 is made of, for example, an insulative material, such as one or more resin materials.

The mover 5 of the first embodiment is comprised of a metallic platy member having electrical conductivity. The mover 5 has a predetermined length in a longitudinal direction thereof, and is comprised of the movable contacts 51 respectively mounted on opposing first and second longitudinal ends of a rearward major surface of the plate-like member of the mover 5.

The electromagnetic relay device 1 includes a pressure spring 14 interposed between the mover 5 and a portion of the housing 16; the portion of the housing 16 is arranged at a distance away from the mover 5 in the forward direction. The pressure spring 14 is configured to bias the mover 5 in the rearward direction. The pressure spring 14 of the first embodiment is, for example, comprised of a coil spring.

The electromagnetic relay device 1 includes first and second stationary members 6, each of which is comprised of a metallic platy member having electrical conductivity. The first and second stationary contacts 61 are mounted on the respective first and second stationary members 6.

The first stationary member 6 is arranged in the housing 16 such that the first stationary contact 61 faces the first movable contact 51 mounted on the first longitudinal end of the rearward major surface of the plate-like member of the mover 5. Similarly, the second stationary member 6 is arranged in the housing 16 such that the second stationary contact 61 faces the second movable contact 51 mounted on the second longitudinal end of the rearward major surface of the plate-like member of the mover 5.

The first and second stationary members 6 are fixed to the housing 16. A portion of each of the first and second stationary members 6 is drawn out externally from the inside of the housing 16, and the drawn-out portion of each of the first and second stationary members 6 is electrically connected to, for example, a corresponding one of external wires.

Forward movement of the plunger 2 in the forward direction pushes the mover 5 to cause the mover 5 to move in the forward direction against the biasing force of the pressure spring 14. The solenoid unit 4 serves to cause the plunger 2 to reciprocate in the reciprocation direction Z.

The solenoid unit 4 includes a magnetizing coil 41, a stationary core 42, a movable core 43, and a yoke 44. Energization of the magnetizing coil 41 causes the magnetizing coil 41 to generate magnetic flux through a magnetic path that is comprised of the stationary core 42, movable core 43, and the yoke 44.

The magnetizing coil 41 is fixedly installed in the housing 16. The magnetizing coil 41 is comprised of a cylindrical tubular bobbin 411, which has a cylindrical tubular body 412, and a wire wound around an outer peripheral surface of the cylindrical tubular body 412 of the bobbin 411. The cylindrical tubular body 412 has an inner cylindrical hollow defined thereinside, and the inner cylindrical hollow has both opening ends toward the respective forward and rearward directions of the Z direction. A part of the plunger 2 is arranged in the inner cylindrical hollow of the cylindrical tubular body 412.

The stationary core 42, which is made of soft magnetic metal, is arranged inside the cylindrical tubular body 412 of the magnetizing coil 41 to face the movable core 43 in the Z direction. In other words, the stationary core 42 is located at the back side of the movable core 43.

The electromagnetic relay device 1 includes a return spring 13 interposed between the stationary core 42 and the movable core 43. The return spring 13, which is comprised of for example a coil spring according to the first embodiment, is configured to bias the movable core 43 to move the movable core 43 toward the stationary core 42 in the forward direction. That is, the return spring 13 biases the movable core 43 to thereby bias the plunger 2 in the forward direction.

The plunger 2 of the first embodiment includes the movable core 43 and a shaft member 21 around which the movable core 43 is mounted. The shaft member 21 is made of non-magnetic metal, but can be made of magnetic metal. The plunger 2 can be comprised of only the movable core 43.

Specifically, the movable core 43 has a through hole formed therethrough, and is fixed to the shaft member 21 while the shaft member 21 is penetrated through the through hole of the movable core 43. This configuration enables the movable core 43 and the shaft member 21 to move together. At least part of the movable core 43 is disposed in the hollow of the cylindrical tubular body 412.

As described above, the insulator 31 and the heat-resistant member 32 are arranged at a forward end of the plunger 2. The insulator 31 is made of an insulative material, such as one or more resin materials. The heat-resistant member 32 is made of, for example, iron or iron alloy.

The insulator 31 is arranged, i.e., interposed, between the plunger 2 and the heat-resistant member 32 to prevent the plunger 2 and the heat-resistant member 32 from directly abutting onto each other.

The heat-resistant temperature of the heat-resistant member 32 is, as described above, set to be higher than that of the insulator 31. For example, the heat-resistant member 32 has a predetermined level of heat resistance that is unlikely to deform up to 400° C. or more. Each of the insulator 31 and the heat-resistant member 32 individually has a thermal conductivity, and the thermal conductivity of the heat-resistant member 32 is set to be lower than that of the insulator 31.

The insulator 31 has opposing forward and rearward ends in the Z direction, and is comprised of a forward recess 311 formed in the forward end of the insulator 31, and a rearward recess 312 formed in the rearward end of the insulator 31. The shaft member 21 has a forward end that is pressed to fit in the rearward recess 312 of the insulator 31, so that the insulator 31 is fixed to the shaft member 21.

The heat-resistant member 32 is comprised of a rearward portion that is shaped to have a smaller diameter than that of the remaining portion thereof; the rearward end, which has the smaller diameter, of the heat-resistant member 32 serves as a small-diameter portion 323. The small-diameter portion 323 of the heat-resistant member 32 is pressed to fit in the forward recess 311 of the insulator 31, so that the heat-resistant member 32 is fixed to the insulator 31.

The insulator 31 is comprised of an insulator body 313 interposed between (i) the forward end of the shaft member 21, which is fit in the rearward recess 312 of the reward end thereof, and (ii) the small-diameter portion 323 of the heat-resistant member 32, which is fit in the forward recess 311 of the forward end thereof. That is, the heat-resistant member 32 has an indirect fixture to the shaft member 21 through the insulator 31 without direct abutment onto the shaft member 21.

The heat-resistant member 32 is also comprised of a substantially cylindrical forward portion that serves as an abutment portion 321 in addition to the small-diameter portion 323; the abutment portion 321 abuts onto the mover 5. The abutment portion 321 has a forward end surface, i.e., an abutment end surface, 322 that enables abutment onto the rearward major surface of the plate-like member of the mover 5. The abutment end surface 322 has a substantially circular shape, which is not illustrated.

The plunger 2 is configured to cause the mover 5 to reciprocate in the reciprocation direction Z while the abutment end surface 322 of the heat-resistant member 32 is in abutment with the rearward major surface of the plate-like member of the mover 5.

Next, the following describes how the plunger 2 operates in response to energization or de-energization of the magnetization coil 41.

Energization of the magnetization coil 41 causes magnetic flux to flow through the magnetic path that is comprised of the stationary core 42, movable core 43, and the yoke 44. The magnetic flux generates magnetic attractive force between the movable core 43 and the stationary core 42. The generated magnetic attractive force causes, as illustrated in FIG. 2, the plunger 2, which includes the movable core 43, to be magnetically attracted to the stationary core 42 against the biasing force of the forward biasing member 13 in the rearward direction, resulting in the plunger 2 moving in the rearward direction. The biasing force of the pressure spring 14 therefore causes the mover 5 to move in the rearward direction with the rearward movement of the plunger 2, resulting in the movable contacts 51 abutting onto the respective stationary contacts 61. This causes the electromagnetic relay device 1 to be switched on. This enables a current to flow from one of the first and second stationary members 6 to the other thereof through the mover 5. The switched-on state of the electromagnetic relay device 1 maintains the abutment end surface 322 of the heat-resistant member 32 in a separate state from the rearward major surface of the mover 5, resulting in a clearance G between the rearward major surface of the plate-like member of the mover 5 and the abutment end surface 322 of the heat-resistant member 32.

Next, de-energization of the magnetizing coil 41, which is in an energized state, causes the magnetic attractive force between the stationary core 42 and the movable core 43 to disappear. Because the biasing force of the return spring 13 is set to be larger than the biasing force of the pressure spring 14 according to the first embodiment, the return spring 13 causes the movable core 43 to move in the forward direction due to no magnetic attractive force between the movable core 43 and the stationary core 42. The forward movement of the movable core 43 causes the plunger 2 to push the mover 5 in the forward direction, so that the mover 5 moves away from the stationary contacts 61.

This results in, as illustrated in FIG. 1, the movable contacts 51 being separated from the respective stationary contacts 61. This causes the electromagnetic relay device 1 to be switched off while the abutment end surface 322 of the heat-resistant member 32 is in abutment with the rearward major surface of the plate-like member of the mover 5.

When the electromagnetic relay device 1 is changed from the switched-on state to the switch-off state, the electromagnetic relay device 1 is kept in the switched-on state while an electrical arc is generated in a contact region 11 defined between the stationary contacts 61 and the movable contacts 51. In order to extend the length of the electrical arc to thereby extinguish the electrical arc, the electromagnetic relay device 1 includes an arc-extinction magnet 15 located radially outside the contact region 11. The arc-extinction magnet 15 causes the electrical arc created in the contact region 11 to extend in a direction orthogonal to the reciprocation direction of the mover 5, thus extinguishing the electrical arc.

Next, the following describes how the electromagnetic relay device 1 according to the first embodiment works.

The heat-resistant member 32 of the electromagnetic relay device 1 is interposed between the insulator 31 and the mover 5. This suppresses an increase in the temperature of the insulator 31 even if the temperature of the mover 5 becomes high due to an increase in a current flowing in the electromagnetic relay device 1. This therefore prevents a detrimental effect due to the high-temperature mover 5 on operations of the electromagnetic relay device 1.

As described above, a large amount of current may flow through the mover 5 in the switched-on state of the electromagnetic relay device 1. This may cause the mover 5 to become higher in temperature. In the switched-on state of the electromagnetic relay device 1, because the mover 5 is unpressed by the plunger 2 as illustrated in FIG. 2, heat transfer from the mover 5 to the insulator 31 is restricted.

In contrast, when the switched-on state of the electromagnetic relay device 1 is changed to the switch-off state, the plunger 2 presses the high-temperature mover 5 as illustrated in FIG. 1. This may result in heat due to the high-temperature mover 5 being transferred to the insulator 31 mounted to the forward end of the plunger 2.

From this viewpoint, the heat-resistant member 32 mounted to the forward end of the insulator 31 according to the first embodiment prevents the insulator 31 from directly contacting with the mover 5, making it possible to prevent deformation of the insulator 31 due to heat.

Deformation of the insulator 31 might result in abnormal motion and/or abnormal posture of the mover 5 during, for example, forward movement of the mover 5 by the plunger 2. This might therefore result in a detrimental effect on reliable switch-off of the electromagnetic relay device 1.

For addressing such an issue, the electromagnetic relay device 1 is, as described above, configured to prevent, for example, deformation of the insulator 31, thus maintaining reliable switch-off of the electromagnetic relay device 1.

Additionally, the electromagnetic relay device 1 is configured such that the heat-resistant member 32 is arranged to directly abut onto the mover 5. This configuration results in the heat-resistant member 32 being unlikely to deform. Arrangement of the heat-resistant member 32 between the mover 5 and the insulator 31 restricts heat transfer from the mover 5 to the insulator 31.

The thermal conductivity of the heat-resistant member 32 is set to be lower than that of the insulator 31. This setting results in heat from the mover 5 being more unlikely to transfer through the heat-resistant member 32 to the insulator 31, making it possible to prevent an increase in temperature of the insulator 31 more reliably.

As described in detail above, the electromagnetic relay device 1 according to the first embodiment prevents a detrimental effect due to the high-temperature mover 5 on operations of the electromagnetic relay device 1.

Second Embodiment

The electromagnetic relay device 1 according to the second embodiment has one of the following first to third configurations.

The first configuration is that a first region of the forward end surface of the heat-resistant member 32, which enables abutment onto the rearward end surface of the mover 5, has been embossed.

The second configuration is that a second region of the rearward end surface of the mover 5, which enables abutment onto the forward end surface of the heat-resistant member 32, has been embossed.

The third configuration is that the first region of the forward end surface of the heat-resistant member 32, which enables abutment onto the rearward end surface of the mover 5, has bene embossed, and the second region 12 of the rearward end surface of the mover 5, which enables abutment onto the forward end surface of the heat-resistant member 32, has been embossed.

Figure 3:
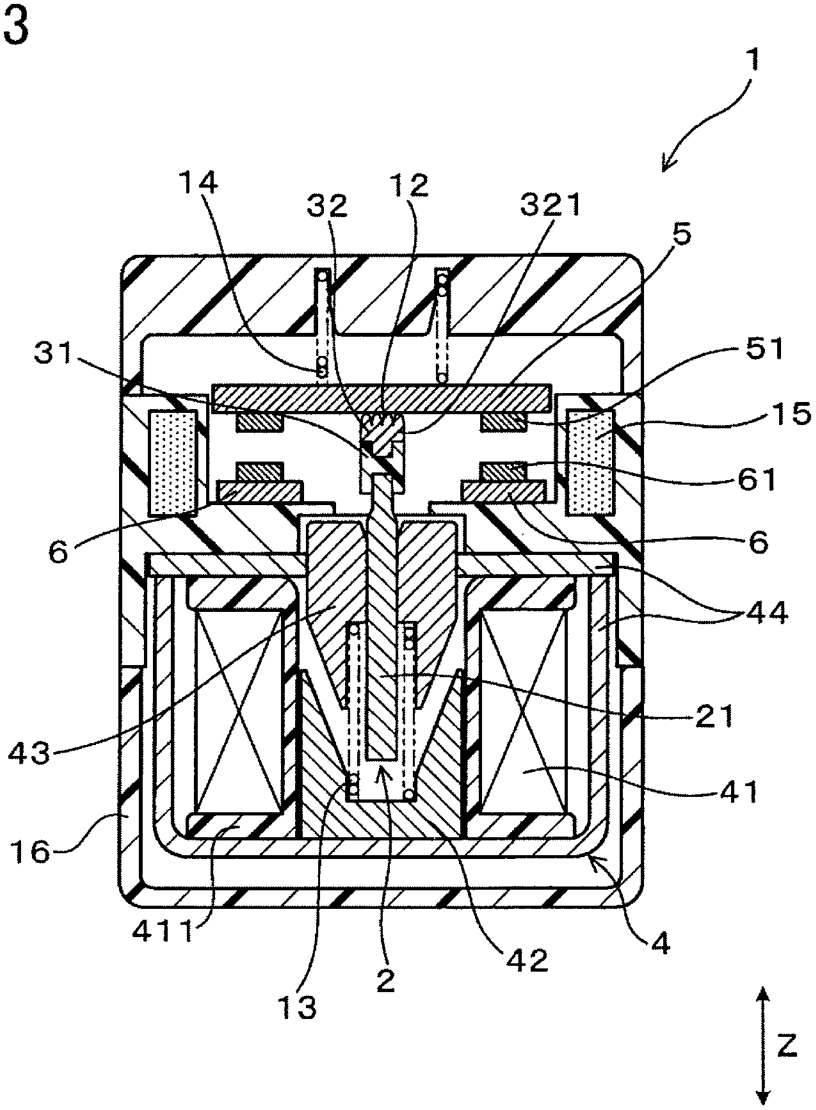
FIG. 3 is an axial cross-sectional view of an electromagnetic relay device according to the second embodiment.

The heat-resistant member 32 is, as illustrated in FIG. 3, fixed to the plunger 32 through the insulator 31. At least one of the first region of forward end surface of the heat-resistant member 32 and the rearward end surface of the mover 5 has been embossed as an embossed region 12 as described above.

In the electromagnetic relay device 1 according to the second embodiment, the first region of the forward end surface of the heat-resistant member 32, which enables abutment onto the rearward end surface of the mover 5, is shaped as the embossed region 12, and the second region of the rearward end surface of the mover 5, which enables abutment onto the forward end surface of the heat-resistant member 32, is shaped as a substantially flat region. The embossed region 12 of the forward end surface of the heat-resistant member 32 is arranged to enable abutment onto the substantially flat region of the rearward end surface of the mover 5.

Specifically, plural projections are formed on the first region of the forward end surface of the heat-resistant member 32, which enables abutment onto the second region of the rearward end surface of the mover 5; the plural projections project toward the mover 5. The plural projections on the first region of the forward end surface of the heat-resistant member 32 define indentations thereamong. A forward end of each projection on the first region of the forward end surface of the heat-resistant member 32 enables abutment onto the flat region of the rearward end surface of the mover 5.

The other components of the electromagnetic relay device 1 according to the second embodiment are substantially identical to the corresponding respective components of the electromagnetic relay device 1 according to the first embodiment.

To each of components described in the first and subsequent embodiments, which are substantially identical or equivalent to each other, a corresponding common reference character will be assigned unless specific information is added to the corresponding component.

At least one of (i) the first region of the forward end surface of the heat-resistant member 32, which enables abutment onto the rearward end surface of the mover 5, and (ii) the second region of the rearward end surface of the mover 5, which enables abutment onto the forward end surface of the heat-resistant member 32, is shaped as the embossed region 12. This enables a smaller area of contact between the forward end surface of the heat-resistant member 32 and the rearward end of the mover 5. This results in heat from the mover 5 being more unlikely to transfer to the heat-resistant member 32, making it possible to further prevent an increase in temperature of the insulator 31

The electromagnetic relay device 1 according to the second embodiment offers additional advantageous effects that are identical to those offered by the electromagnetic relay device 1 according to the first embodiment.

The second region of the rearward end surface of the mover 5, which enables abutment onto the forward end surface of the heat-resistant member 32, can be shaped as embossed region 12, and the first region of the forward end surface of the heat-resistant member 32, which enables abutment onto the second region of the rearward end surface of the mover 5, can be shaped as a substantially flat region.

The first region of the forward end surface of the heat-resistant member 32, which enables abutment onto the rearward end surface of the mover 5, can be shaped as the embossed region 12, and the second region of the rearward end surface of the mover 5, which enables abutment onto the forward end surface of the heat-resistant member 32, can be shaped as the embossed region. In this modification, the projections on the first region of the forward end surface of the heat-resistant member 32 are arranged to abut onto the respective projections on the second region of the rearward end surface of the mover 5.

Third Embodiment

The electromagnetic relay device 1 according to the third embodiment is modified such that the heat-resistant member 32 has a given degree of elasticity, in other words, the heat-resistant member 32 serves as an elastic member.

Figure 4:
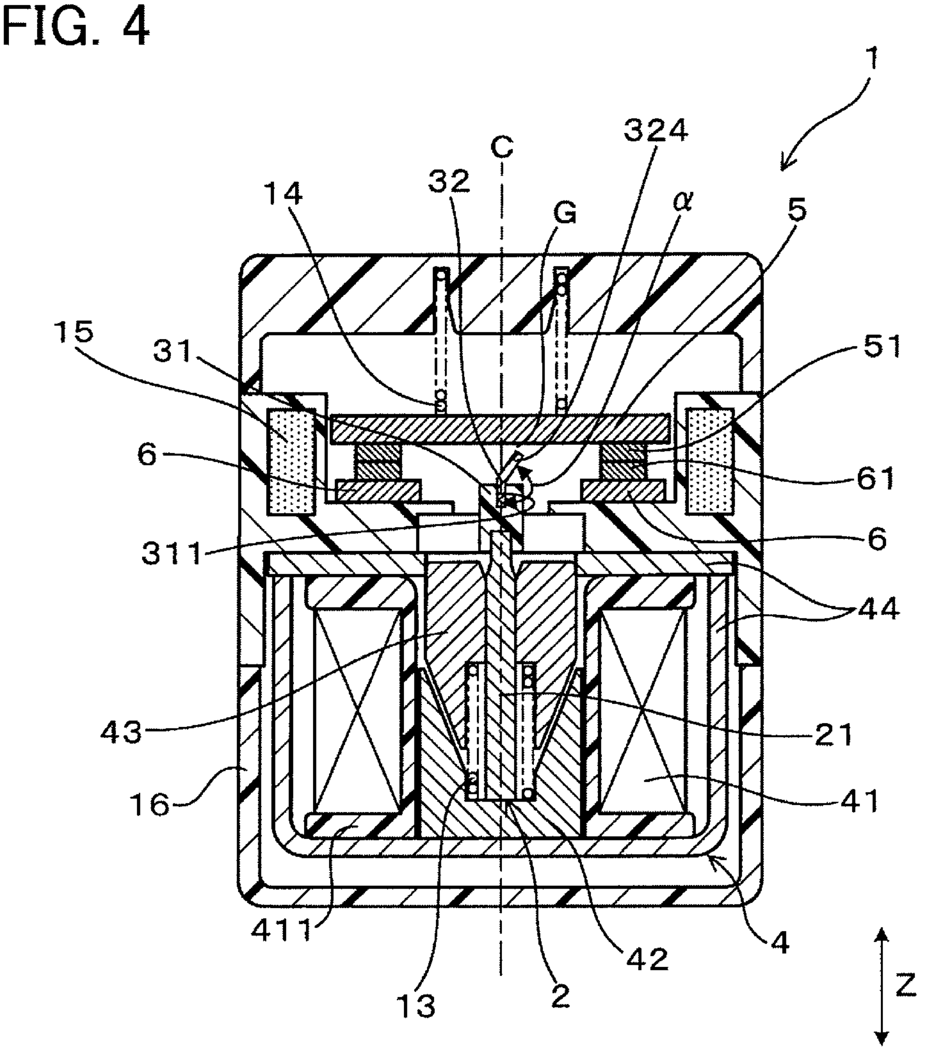
FIG. 4 is an axial cross-sectional view of an electromagnetic relay device according to the third embodiment with the heat-resistant member separated from the mover.
Figure 5:
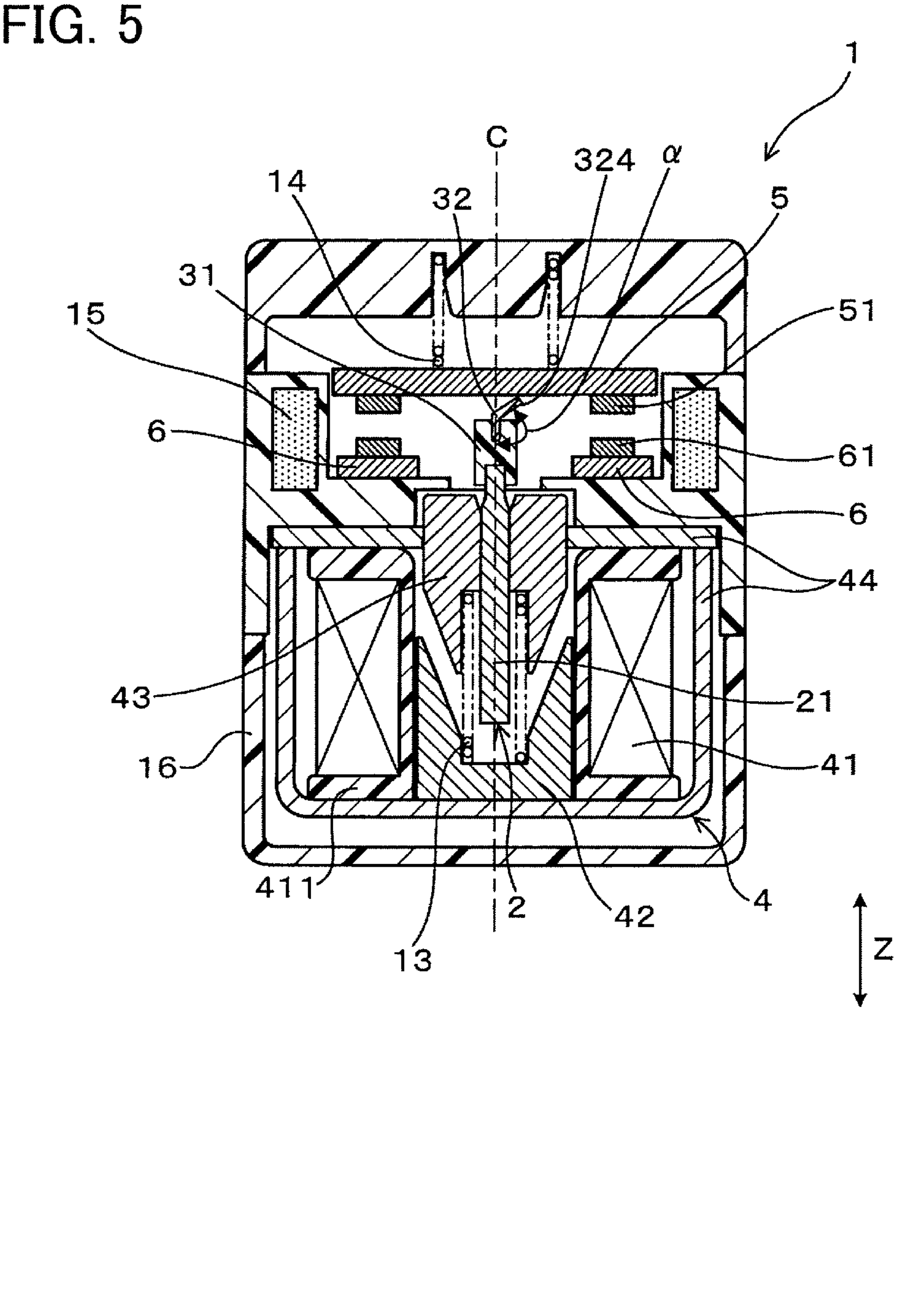
FIG. 5 is an axial cross-sectional view of the electromagnetic relay device according to the third embodiment with the heat-resistant member abutting onto the mover.

The plunger 2 has a center axis C aligned with the Z direction. As an example, the heat-resistant member 32 consists of a bent or curved leaf spring. The heat-resistant member 32 is comprised of a rearward portion and, as illustrated in FIGS. 4 and 5, a forward portion 324 radially inclined with respect to the center axis C of the plunger 2, which is aligned with the Z direction; the forward portion 324 will be therefore referred to as an inclined portion 324.

The rearward portion of the heat-resistant member 32 is pressed to fit in the forward recess 311 of the insulator 31 while being aligned with the center axis C of the plunger 2, so that the heat-resistant member 32 is fixed to the insulator 31.

Specifically, the inclined portion 324 of the heat-resistant member 32 is inclined with respect to the center axis C of the plunger 2 such that the inclined portion 324 gradually separates from the center axis C toward the forward direction.

Changing the magnetization coil 41 from the energization state (see FIG. 4) to the de-energization state (see FIG. 5) results in the inclined portion 324 of the heat-resistant member 32 abutting onto the mover 5. This causes the heat-resistant member 32 to be elastically deformed.

Specifically, the inclined portion 324 of the heat-resistant member 32, which separates from the mover 5 in the energization state of the magnetization coil 41, has a forward inclined angle and a rearward inclined angle $\alpha$ formed between the inclined portion 324 and the center axis C of the plunger 2 (see FIG. 4); the rearward inclined angle $\alpha$ is a predetermined obtuse angle.

In contrast, as illustrated in FIG. 5, de-energization of the magnetizing coil 41 causes the inclined portion 324 of the heat-resistant member 32 to abut onto the mover 5. Abutment of the inclined portion 324 onto the mover 5 causes the inclined portion 324 to be elastically deformed in such a way that the rearward inclined angle $\alpha$ becomes closer to 90 degrees. In other words, the heat-resistant member 32 is configured to be elastically deformed in the Z direction.

The other components of the electromagnetic relay device 1 according to the third embodiment are substantially identical to the corresponding respective components of the electromagnetic relay device 1 according to the first embodiment.

The heat-resistant member 32 also serves as an elastic member. Abutment of the heat-resistant member 32 onto the mover 5 therefore results in the heat-resistant member 32 being elastically deformed, making it possible to lessen the shock of the abutment of the heat-resistant member 32 onto the mover 5. This results in a lower level of abutment noise generated at the abutment of the heat-resistant member 32 onto the mover 5.

The electromagnetic relay device 1 according to the third embodiment offers additional advantageous effects that are identical to those offered by the electromagnetic relay device 1 according to the first embodiment.

The heat-resistant member 32 can consist of an elastic member shaped like a coil spring.

Fourth Embodiment

The electromagnetic relay device 1 according to the fourth embodiment is modified to include a heat-resistant insulator 30 in place of the insulator 31 and heat-resistant member 32. The heat-resistant insulator 30 is mounted to the forward end of the shaft member 21 of the plunger 2.

Figure 6:
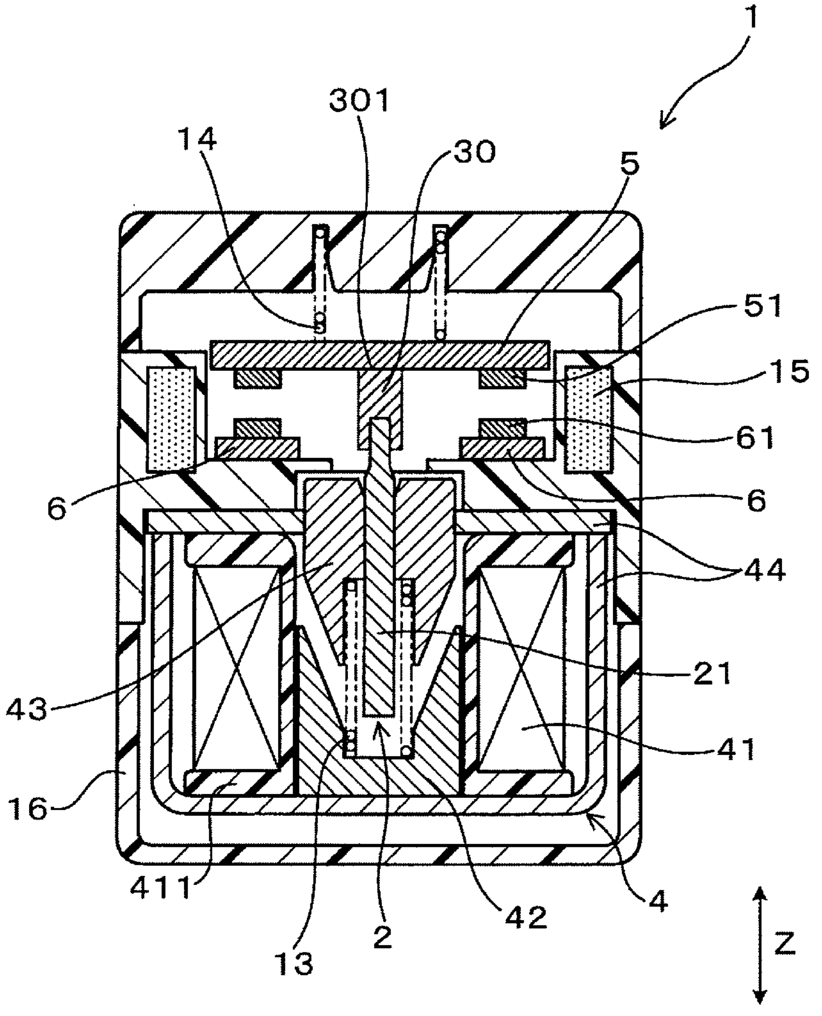
FIG. 6 is an axial cross-sectional view of an electromagnetic relay device according to the fourth embodiment.

Specifically, the electromagnetic relay device 1 of the sixth embodiment includes, as illustrated in FIG. 6, the mover 5, the plunger 2, the solenoid unit 4 for causing the plunger 2 to reciprocate, and the first and second stationary contacts 61.

The mover 5 includes the first and second movable contacts 51 that are movable to abut onto and separate from the respective first and second stationary contacts 61. That is, reciprocation of the plunger 2 causes the mover 5 to reciprocate to accordingly cause the first and second movable contacts 51 to abut onto or separate from the respective first and second stationary contacts 61.

The plunger 2 is arranged to be in an indirect contact with the mover 5 through the heat-resistant insulator 30. The heat-resistant insulator 30 is made of, for example, at least one of glass and ceramic.

The heat-resistant insulator 30 can be made of, for example, alumina or zirconia as an example of ceramic.

As described above, the electromagnetic relay device 1 according to the fourth embodiment is comprised of, in place of the insulator 31 and heat-resistant member 32, the heat-resistant insulator 30, which has both electrical insulation property and heat resistance property, mounted to the forward end of the shaft member 21 of the plunger 2. The heat-resistance insulator 30 has a forward end surface 301 that enables abutment onto the mover 5. Each of the mover 5 and the heat-resistant insulator 30 has a heat-resistant temperature, and the heat-resistant temperature of the heat-resistant insulator 30 is set to be lower higher than that of the mover 5.

The other components of the electromagnetic relay device 1 according to the fourth embodiment are substantially identical to the corresponding respective components of the electromagnetic relay device 1 according to the first embodiment.

The heat-resistant insulator 30 of the electromagnetic relay device 1 according to the fourth embodiment is interposed between the plunger 2 and the mover 5 to electrically insulate therebetween. This results in the heat-resistant insulator 30, which has heat resistance property, being unlikely to deform even if the temperature of the mover 5 becomes high due to an increase in a current flowing in the electromagnetic relay device 1. This therefore prevents a detrimental effect due to the high-temperature mover 5 on operations of the electromagnetic relay device 1.

The thermal conductivity of the heat-resistant insulator 30 is set to be lower than that of the mover 5. This setting results in heat from the mover 5 being more unlikely to transfer through the heat-resistant insulator 30, making it possible to prevent an increase in temperature of the heat-resistant insulator 30.

The heat-resistant insulator 30 of the electromagnetic relay device 1 according to the fourth embodiment, which has both electrical insulation property and heat resistance property, is interposed between the plunger 2 and the mover 5 to electrically insulate therebetween. This enables the electromagnetic relay device 1 according to the fourth embodiment to have a more simplified configuration and prevent a detrimental effect due to the high-temperature mover 5 on operations of the electromagnetic relay device 1.

The electromagnetic relay device 1 according to the fourth embodiment offers additional advantageous effects that are identical to those offered by the electromagnetic relay device 1 according to the first embodiment.

Fifth Embodiment

Figure 7:
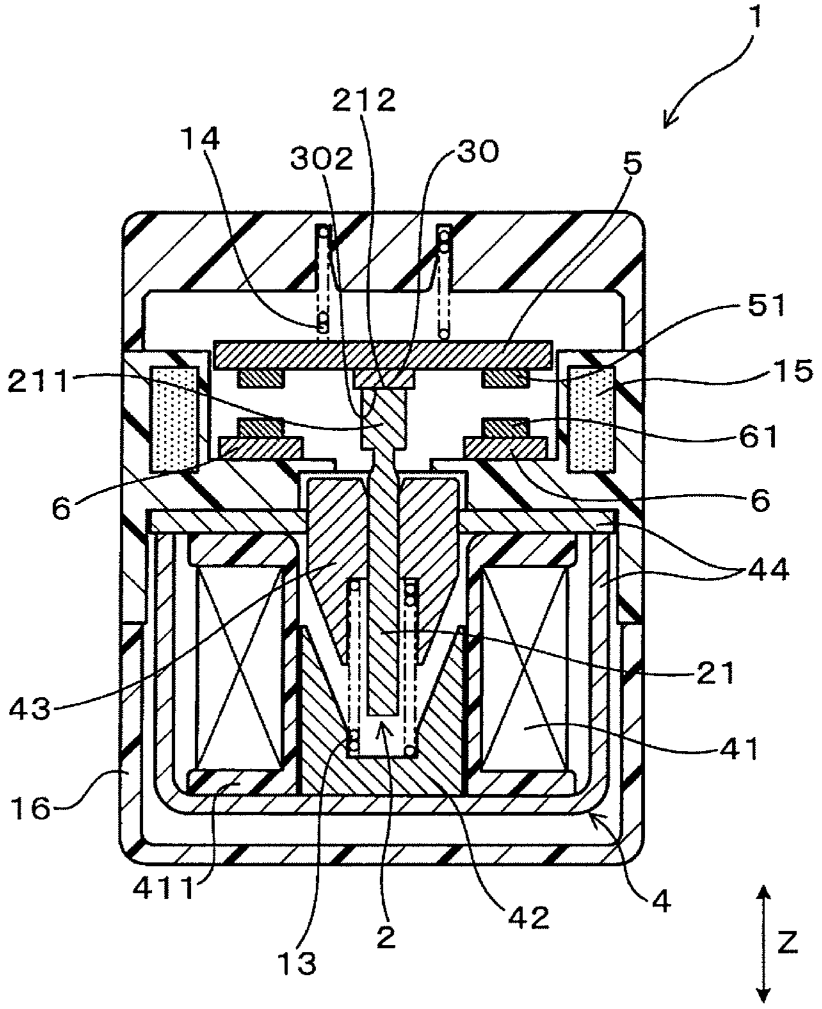
FIG. 7 is an axial cross-sectional view of an electromagnetic relay device according to the fifth embodiment with a large-diameter portion abutting onto a heat-resistant insulator.
Figure 8:
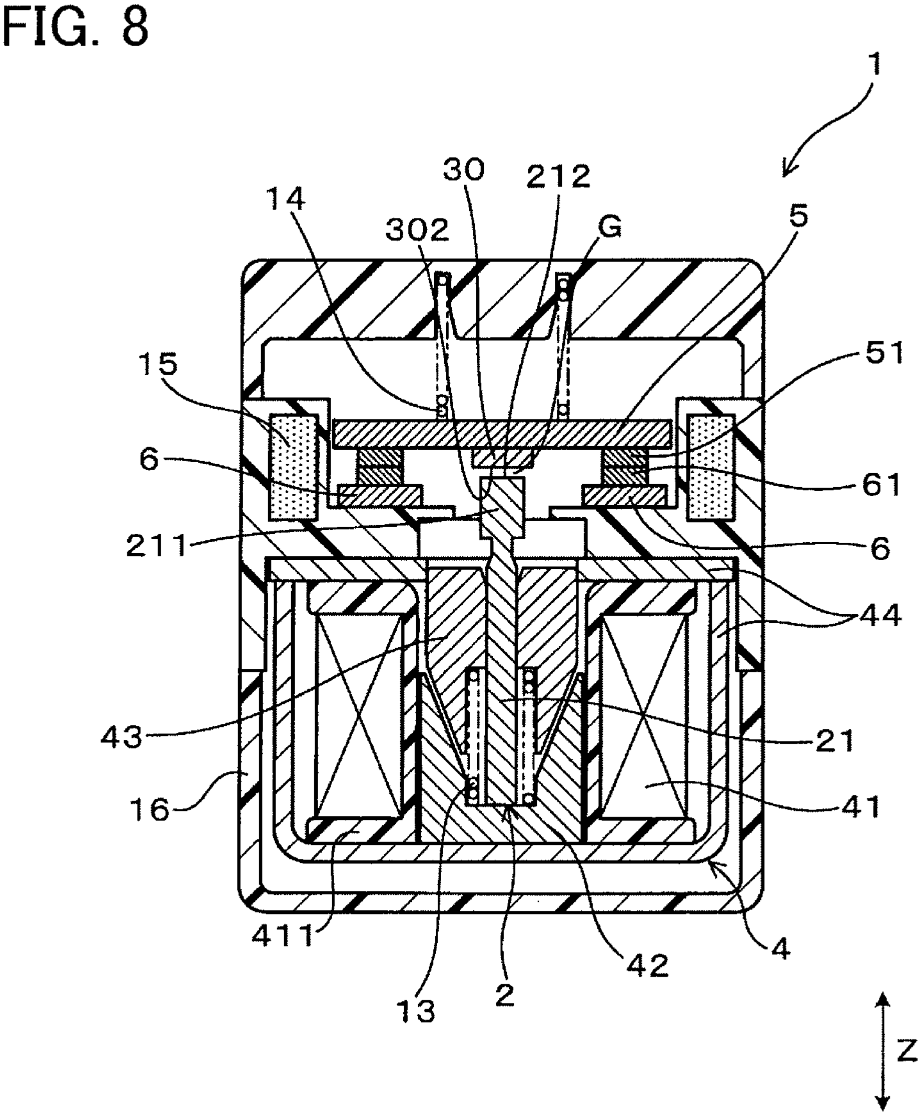
FIG. 8 is an axial cross-sectional view of the electromagnetic relay device according to the fifth embodiment with the large-diameter portion separating from the heat-resistant insulator.

In the electromagnetic relay device 1 according to the fifth embodiment, the heat-resistant insulator 30 has opposing forward and rearward end surfaces, and the forward end surface of the heat-resistant insulator 30 is, as illustrated in FIGS. 7 and 8, mounted to the rearward major surface of the plate-like member of the mover 5. The heat-resistant insulator 30 is arranged such that the forward end of the shaft member 21 of the plunger 2 enables abutment onto the rearward end surface of the heat-resistant insulator 30 whose forward end surface is mounted to the rearward major surface of the plate-like member of the mover 5.

As illustrated in FIGS. 7 and 8, the forward end of the shaft member 21 of the plunger 2 is shaped to have a larger diameter than that of the remaining portion thereof; the forward end, which has the larger diameter, of the shaft member 21 of the plunger 2 serves as a large-diameter portion 211.

The large-diameter portion 322 of the shaft member 21 of the plunger 2 has a forward end surface, i.e., an abutment surface, 212 that abuts onto the rearward major surface of the plate-like member of the mover 5 in the de-energization state of the magnetization coil 41 (see FIG. 7). That is, the forward end, i.e., the large-diameter portion 322, of the shaft member 21 of the plunger 2 is directly in abutment with the rearward end surface of the heat-resistant insulator 30 mounted to the rearward major surface of the plate-like member of the mover 5.

The forward end surface of the heat-resistant insulator 30, which is opposite to the rearward end surface facing the abutment surface 212 of the large-diameter portion 211, is shaped flat; the flat forward end surface of the heat-resistant insulator 30 will be referred to as a flat surface 302. Each of the flat surface 302 of the heat-resistant insulator 30 and the abutment surface 212 of the large-diameter portion 211 has a predetermined area, and the predetermined area of the flat surface 302 is larger than that of the abutment surface 212 of the large-diameter portion 211. The whole of the abutment surface 212 of the large-diameter portion 211 is in abutment with the flat surface 302 of the heat-resistant insulator 30.

The other components of the electromagnetic relay device 1 according to the fifth embodiment are substantially identical to the corresponding respective components of the electromagnetic relay device 1 according to the fourth embodiment.

The heat-resistant insulator 30 according to the fifth embodiment is mounted to the mover 5. This eliminates the need of mounting an insulative member to the plunger 2, resulting in the plunger 2 having a more simplified configuration.

The electromagnetic relay device 1 according to the fifth embodiment offers additional advantageous effects that are identical to those offered by the electromagnetic relay device 1 according to the fourth embodiment.

In place of the heat-resistant insulator 30, the assembly of the insulator 31 and the heat-resistant member 32 can be mounted to the mover 5. In this modification, the forward end the heat-resistant member 32 is fixedly mounted to the mover 5, and the insulator 31 is fixedly mounted to the rearward end of the heat-resistant member 32.

Each of the first to fifth embodiments is configured such that the plunger 2 pushes the mover 5 in the forward direction to thereby cause the first and second movable contacts 51 to separate from the respective first and second stationary contacts 61. Each of the first to fifth embodiments can be however configured such that the plunger 2 pushes the mover 5 in the forward direction to thereby cause the first and second movable contacts 51 to abut onto the respective first and second stationary contacts 61. In this modification, the first and second stationary contacts 61 need be arranged forward from the respective first and second movable contacts 51.

In the electromagnetic relay device 1 according to this modification, energization of the magnetization coil causes the plunger 2 to move in the rearward direction to cause the first and second movable contacts 51 to separate from the respective first and second stationary contacts 61, resulting in the electromagnetic relay device being in the switch-off state.

In contrast, de-energization of the magnetizing coil 41, which is in the energized state, causes the plunger 2 to push the mover 5 in the forward direction. This causes the first and second movable contacts 51 to abut onto the respective first and second stationary contacts 61, resulting in the electromagnetic relay device being in the switched-on state. In this modification, the assembly of the insulator 31 and the heat-resistant member 32 or the heat-resistant insulator can be mounted to any one of the plunger 2 and the mover 5. In this modification, the heat-resistant member 32 can be mounted to the mover 5, and the insulator 31 can be mounted to the plunger 2. This enables electrical insolation between the plunger 2 and the mover 5, and prevents deformation of the insulator 31 due to heat.

The present disclosure is not limited to the above-described embodiments, and can be variably modified within the scope of the present disclosure.

While the illustrative embodiments of the present disclosure have been described herein, the present disclosure is not limited to the embodiments and configurations described herein. Specifically, the present disclosure can include any and all modified embodiments and modifications within the range of equivalency of the present disclosure. Additionally, various combinations of the embodiments, modified combinations to which at least one element has been added, or modified combinations from which at least one element has been eliminated are within the scope of the present disclosure and/or the patentable ideas of the present disclosure.

What is claimed is:

1. An electromagnetic relay device comprising:
- a mover including a movable contact movable to abut onto and separate from a stationary contact;
- a plunger configured to cause the mover to reciprocate to accordingly cause the movable contact to abut onto or separate from the stationary contact;
- a solenoid unit configured to cause the plunger to reciprocate;
- an insulator having a heat-resistant temperature and arranged between the mover and the plunger; and
- a heat-resistant member having a heat-resistant temperature and interposed between the insulator and the mover, the plunger enabling indirect abutment onto the mover through the insulator and the heat-resistant member, the heat-resistant temperature of the heat-resistant member being set to be higher than the heat-resistant temperature of the insulator.

2. The electromagnetic relay device according to claim 1, wherein:

each of the mover and the heat-resistant member has a thermal conductivity; and the thermal conductivity of the heat-resistant member is lower than the thermal conductivity of the mover.

3. The electromagnetic relay device according to claim 1, wherein:

the insulator is fixed to the plunger;

the heat-resistant member is fixed to the insulator, resulting in the heat-resistant member being fixed to the plunger through the insulator;

the heat-resistant member has a first abutment portion that enables abutment onto a second abutment portion of the mover; and a surface of at least one of the first and second abutment portions has been embossed as an embossed surface.

4. The electromagnetic relay device according to claim 1, wherein:

the heat-resistant member has a given degree of elasticity to accordingly serve as an elastic member.

5. An electromagnetic relay device comprising:

a mover including a movable contact movable to abut onto and separate from a stationary contact;

a plunger configured to cause the mover to reciprocate to accordingly cause the movable contact to abut onto or separate from the stationary contact;

a solenoid unit configured to cause the plunger to reciprocate; and a heat-resistant insulator interposed between the plunger and the mover, the plunger enabling indirect abutment onto the mover through the heat-resistant insulator, the heat-resistant insulator being made of at least one of glass and ceramic.

* * * * *